A. NAWADNY.
Tool-Handle.
No. 227,380. Patented May 11, 1880.
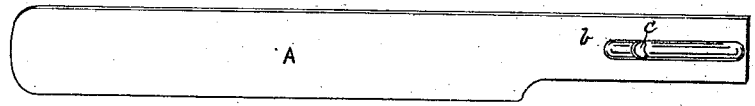
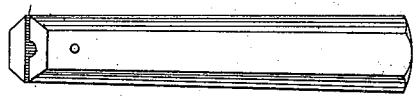
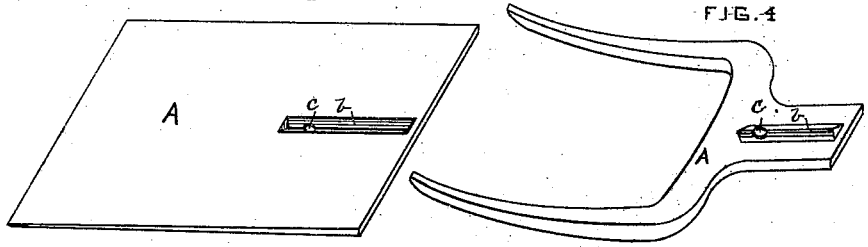
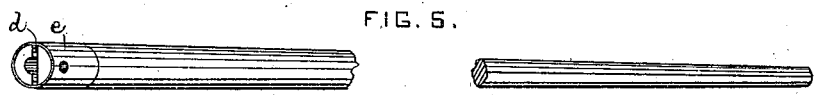
Witnesses.
J. C. Hubbell
P. P. Finney
Inventor.
Albert Nawadny
By H. N. Jenkins
Attorney.

UNITED STATES PATENT OFFICE.

ALBERT NAWADNY, OF NEW ORLEANS, LOUISIANA.

TOOL-HANDLE.

SPECIFICATION forming part of Letters Patent No. 227,380, dated May 11, 1880.

Application filed August 22, 1879.

*To all whom it may concern:*

Be it known that I, ALBERT NAWADNY, a resident of the city of New Orleans, parish of Orleans, and State of Louisiana, have invented a certain new and useful Improvement in Modes of Attaching Handles to Implements, &c.; and I do hereby declare the following to be a full, clear, and correct description of the same, reference being had to the annexed drawings, making a part of this specification.

My invention consists in stamping or otherwise producing a ridge upon one side of an instrument or tool parallel with its sides and near one end of the same, so that the handle, previously bored and slotted, can be fitted to the said part of the implement and be permanently secured thereupon by means of one or more rivets, as will be hereinafter more fully described.

In the drawings, Figure 1 represents a knife-blade with ridge formed thereupon. Fig. 2 is a perspective view of a handle for same; Figs. 3 and 4, views of an improved spade and pitchfork, and Fig. 5 a handle for same.

This invention renders the manufacture of all implements, &c., requiring handles less expensive than heretofore, inasmuch as it dispenses almost, if not entirely, with the forging of the same.

Under my method of attaching handles to implements the blades or points A are cut out of rolled or sheet metal, and the ridge $b$ struck from one side of the same by means of a suitable punch or die. One or more holes, $c$, are then drilled through the apex of the ridge for the reception of rivets, whereby they are permanently secured to their handles.

The handles are first made of the required size and shape. A hole is then drilled in one end of each, usually in the direction of the axis thereof, to a depth about equal to the distance from the inner end of the ridge to the rear of the implement. By means of a saw a cut is next made in the same direction and to the same depth as the hole above mentioned, in the direct line of one edge thereof, so as to leave, when completed, a perfectly flat surface upon one side of the slot $d$ and a grooved surface upon the opposite side thereof. The handle is then slipped with the grooved portion over the ridge of the implement. Rivets are then inserted in holes corresponding with those made in the latter, and the two pieces securely fastened together thereby.

If preferred, the ridges can be forged or riveted on the implements, and in order to produce a better finish, as well as to strengthen the handles, ferrules may be secured over the slotted ends of the same, as shown at $e$.

Having described my invention, what I claim as new, and desire to secure by Letters Patent, is—

The combination of the flat tang of a knife-blade or fork provided with a central longitudinal raised ridge, a handle provided with a slot corresponding with the flat tang and a longitudinal groove to pass over the raised portion of the tang, and one or more fastening-rivets, substantially as shown and described.

In testimony whereof I have hereunto signed my name.

ALBERT NAWADNY.

In presence of—
ALFRED W. J. MASON,
HUGH PIERSON.